United States Patent
Ikeda

(10) Patent No.: US 7,579,944 B2
(45) Date of Patent: Aug. 25, 2009

(54) INFORMATION PROVISION SYSTEM AND TERMINAL FOR SAME AND PROGRAM FOR SAME

(75) Inventor: Hirotane Ikeda, Nagoya (JP)

(73) Assignee: DENSO CORPORATION, Kariya (JP)

( * ) Notice: Subject to any disclaimer, the term of this patent is extended or adjusted under 35 U.S.C. 154(b) by 303 days.

(21) Appl. No.: 11/724,317

(22) Filed: Mar. 15, 2007

(65) Prior Publication Data

US 2007/0233328 A1 Oct. 4, 2007

(30) Foreign Application Priority Data

Mar. 17, 2006 (JP) .............................. 2006-074990

(51) Int. Cl.
*B60Q 1/00* (2006.01)
(52) U.S. Cl. .................. 340/457; 340/438; 340/538.11; 700/108; 701/29; 702/182
(58) Field of Classification Search .................. 340/438, 340/425.5, 457; 700/108; 701/29, 33; 702/182–183
See application file for complete search history.

(56) References Cited

U.S. PATENT DOCUMENTS

| 6,097,313 | A | * | 8/2000 | Takahashi et al. | ........... 340/905 |
| 7,173,517 | B2 | * | 2/2007 | Kondo et al. | ........... 340/426.16 |
| 2005/0283286 | A1 | | 12/2005 | Kanda et al. | |

FOREIGN PATENT DOCUMENTS

| JP | A-2001-160192 | 6/2001 |
| JP | A-2002-120670 | 4/2002 |
| JP | 2005-100272 | 4/2005 |
| JP | A-2006-004180 | 1/2006 |
| JP | A-2006-15938 | 1/2006 |

OTHER PUBLICATIONS

Office Action issued on May 25, 2009 from the Japanese Patent Office in the corresponding Japanese patent application No. 2006-074990 (with English translation).

* cited by examiner

*Primary Examiner*—Davetta W Goins
*Assistant Examiner*—Samuel J Walk
(74) *Attorney, Agent, or Firm*—Posz Law Group, PLC

(57) ABSTRACT

An information provision system of the present disclosure stores a current vehicle condition and a normal unattended condition of the vehicle as relevant information in a driver's unit, when a driver of a vehicle gets off the vehicle. The relevant information in the driver's unit is transmitted to a facility unit when the driver having the driver's unit reaches a facility that has the facility unit. The facility unit that has received the relevant information provides a notice that how the current vehicle condition is different from the normal unattended condition of the vehicle based on a comparison result of the current vehicle condition and the normal unattended condition in the reference condition. The driver of the vehicle or the like is encouraged to change the current vehicle condition to an appropriate one when he/she receives the notice that the current vehicle condition is different from the normal unattended condition.

11 Claims, 5 Drawing Sheets

INFORMATION PROVISION SYSTEM AND TERMINAL FOR SAME AND PROGRAM FOR SAME

CROSS REFERENCE TO RELATED APPLICATION

This application is based on and claims the benefit of priority of Japanese Patent Application No. 2006-74990 filed on Mar. 17, 2006, the disclosure of which is incorporated herein by reference.

FIELD OF THE INVENTION

The present invention generally relates to a vehicle information system for providing driver related information for a system in a vehicle.

BACKGROUND INFORMATION

In recent years, various techniques for managing driver's preference of vehicle control arrangement have been proposed. For example, Japanese patent document JP-A-2002-120670 discloses a system that manages a preference of respective drivers by storing preference data in a memory and providing it for vehicular devices. By using this system, the driver of the vehicle can easily restore the vehicle control arrangement according to his/her preference based on the provided preference data.

However, this vehicle information system only serves for restoring the stored configuration of the vehicle control arrangement, thereby being unable to improve inconvenience of the driver when the vehicle is unattended/unoccupied. That is, for example, the driver may forget to turn off lamps, may forget to lock the door, or may forget to set other device conditions to a normal unattended condition. The vehicle left unattended in an abnormal unattended condition is not desirable, because the abnormal unattended condition is prone to a theft, or leads to draining battery or other similar inconvenience.

SUMMARY OF THE INVENTION

In view of the above and other problems, the present invention provides an information provision system that enables to improve inconvenience of the driver when a condition of a vehicle that is left unattended is different from an appropriate parking condition.

The information provision system having a vehicle unit disposed on a vehicle, a driver unit held by a driver of the vehicle, and a facility unit provided in a facility that can be visited by the driver includes a condition detector in the vehicle unit for detecting a current vehicle condition regarding various parts in the vehicle, an absence detector in the vehicle unit for detecting driver's absence condition from the vehicle based on the current vehicle condition detected by the condition detector, a vehicle side transmitter in the vehicle unit for transmitting the current vehicle condition detected by the condition detector in association with a normal unattended condition that is defined as a normal condition of an unattended vehicle as relevant information, an information storage in the driver unit for storing the relevant information transmitted from the vehicle unit, a driver side transmitter in the driver unit for transmitting the relevant information stored in the information storage to the facility unit, a difference detector in the facility unit for detecting a degree of difference between the current vehicle condition and the normal unattended condition in the relevant information, and a notification device in the facility unit for providing a notice according to a detection result derived from the difference detector.

The information provision system of the present disclosure can detect the condition of the vehicle in comparison with the normal condition for parking the vehicle, and store the detected condition and the normal condition as relevant information in the driver unit.

Then, the driver unit held by the driver enters into a reception area of the facility unit for transmitting the relevant information to the facility unit. Then, the facility unit determines the degree of difference of the detected condition from the normal condition for providing a notice.

Therefore, the information provision system can provide the notice to the driver of the vehicle for notifying that the vehicle is left unattended in an inappropriate condition, and the driver may be encouraged to change the inappropriate condition of the vehicle. That is, a lamp turn-on condition of the unattended vehicle may be detected and notified to the driver, or a door unlock condition of the vehicle may be detected and notified to the driver. As a result, the lamp turn-on condition or the door unlock condition of the vehicle may be resolved for preventing the inconvenience of the driver such as a draining battery, a theft of the personal belongings or the like.

BRIEF DESCRIPTION OF THE DRAWINGS

Other objects, features and advantages of the present invention will become more apparent from the following detailed description made with reference to the accompanying drawings, in which.

DETAILED DESCRIPTION

Preferred embodiments of the present invention will now be described with reference to the accompanying the drawings.

Figure 1:
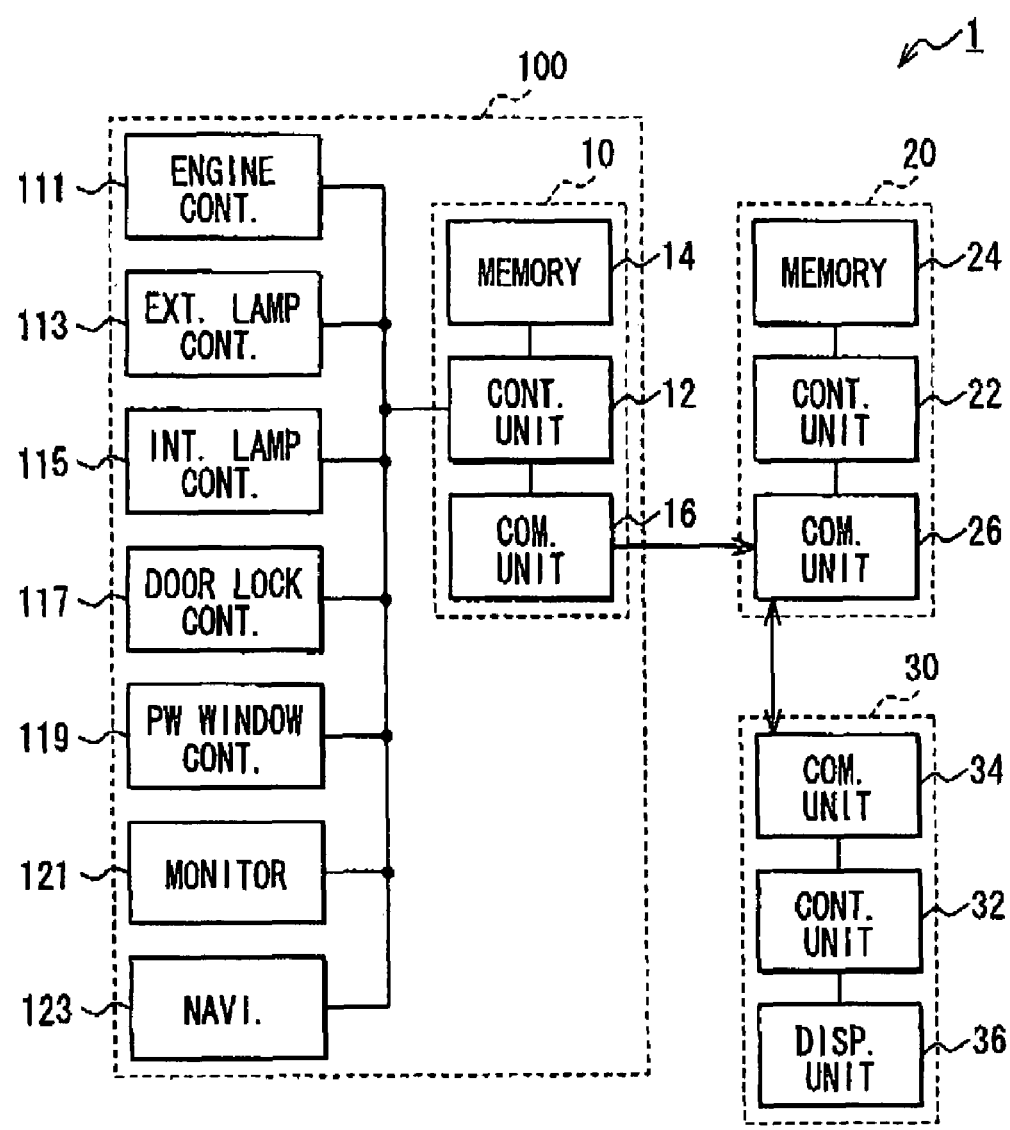
FIG. 1 shows a block diagram of an information provision system in an embodiment of the present disclosure.

FIG. 1 shows a block diagram of an information provision system 1 in an embodiment of the present disclosure. The information provision system 1 includes a vehicle unit 10 disposed on a vehicle 100, a driver unit being held by a driver of the vehicle 100, and a facility unit 30 provided for a facility that may be visited by the driver.

The vehicle unit 10 includes a control unit 12 for controlling an entire operation of the vehicle unit 10, a memory 14 for storing various information, and a communication unit 16 for transmitting data to the driver unit 20 by a radio communication. The control unit 12 is connected in a communicable manner with various devices on the vehicle, and receives notice from each of those devices.

The various devices on the vehicle includes the following devices. That is, an engine controller 111, an external lamp controller 113, an internal lamp controller 115, a door lock controller 117, a power window controller 119, a monitor camera 121, and a navigation system 123 are connected with the control unit 12. The those devices are either configured to report a periodical notice of detected condition to the vehicle unit 10, or configured to report a notice of detected condition on demand to the vehicle unit 10.

The engine controller 111 is used for controlling an engine of the vehicle 100, and outputs, to the vehicle unit 10, numerical parameters of operation conditions of the engine such as "1" for starting, "0" for starting, or the like.

The external light controller 113 is used for controlling an external light of the vehicle 100 such as a headlamp or the like, and outputs, to the vehicle unit 10, numerical parameters of operation conditions of the external lamp such as "1" for turn-on, "0" for turn-off, or the like.

The internal light controller 115 is used for controlling an internal light of the vehicle 100 such as a room lamp or the like, and outputs, to the vehicle unit 10, numerical parameters of operation conditions of the internal light such as "1" for turn-on, "0" for turn-off, or the like.

The door lock controller 117 is used for controlling a door lock of the vehicle 100, and outputs, to the vehicle unit 10, numerical parameters of operation conditions of the door lock such as "1" for lock, "0" for unlock, or the like.

The power window controller 119 is used for controlling a power window of the vehicle 100, and outputs, to the vehicle unit 10, numerical parameters of operation conditions of the power window such as "10" for full-open, "0" for close, or the like according to a degree of opening of the window.

The monitor camera 121 is used for imaging an internal condition of the vehicle 100, and outputs, to the vehicle unit 10, numerical parameters of internal conditions of the vehicle 100 (i.e., an image inside of the vehicle 100).

The driver unit 20 includes a control unit 22 for controlling an entire operation of the driver unit 20, a memory 24 for storing various information such as relevant information (described later), and a communication unit 26 for transmitting data to the vehicle unit 10 and the facility unit 30 by a radio communication. In the present embodiment, the driver unit 20 is formed integrally with an engine key of the vehicle 100.

The facility unit 30 includes a control unit 32 for controlling an entire operation of the facility unit 30, a communication unit 34 for transmitting data to the driver unit 20, and a display unit 36 for displaying various information as a notice upon receiving instruction from the control unit 32.

Figure 2:
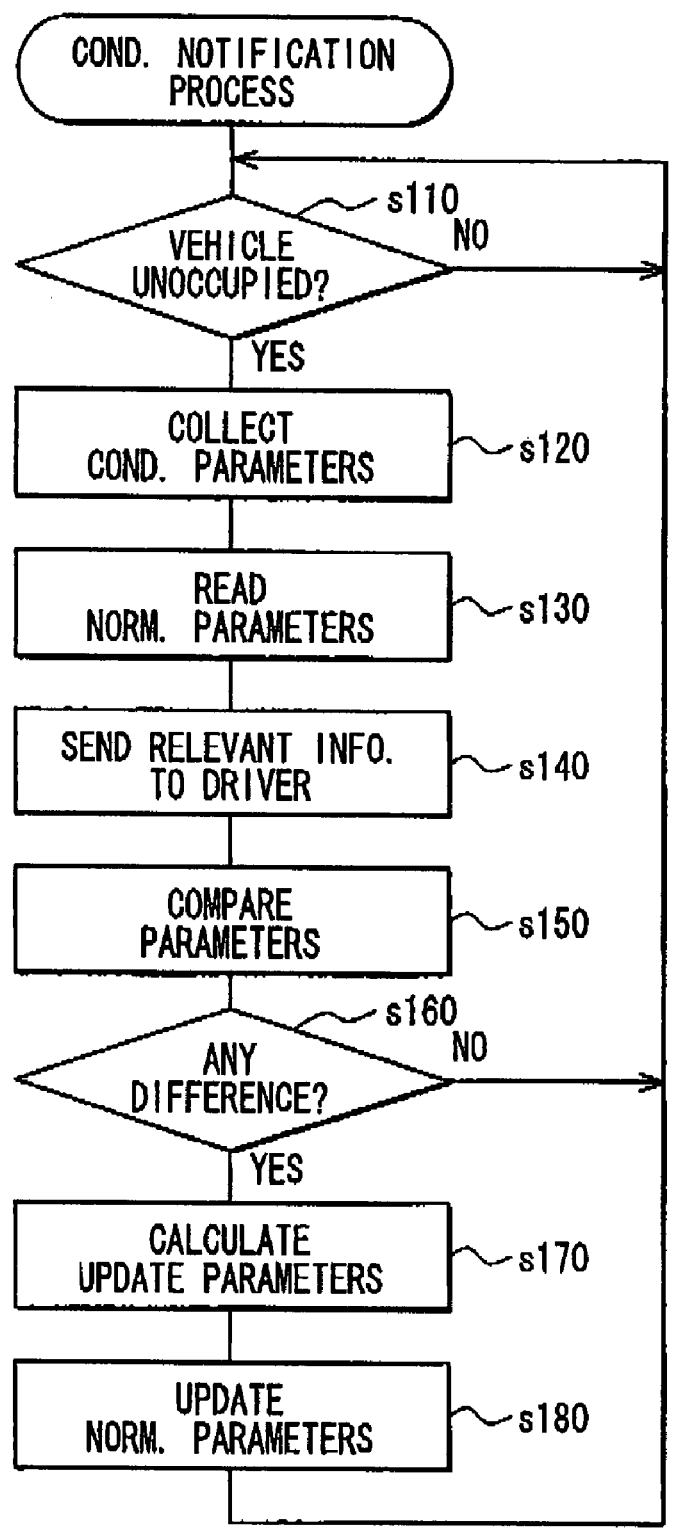
FIG. 2 shows a flowchart of a condition notification process in a vehicle unit in the embodiment.

FIG. 2 shows a flowchart of a condition notification process executed in the control unit 12 of the vehicle unit 10. The condition notification process is repeatedly executed after the vehicle unit 10 in the vehicle 100 is started (i.e., an ignition key of the vehicle 100 is turned on).

After starting the notification process, the process waits for an unoccupied condition of the vehicle 100, that is, a driver's action for getting off from the vehicle 100 in step S100. In this case, a notice from the engine controller 111 that the engine has stopped without having an engine start notice in a predetermined time (e.g., in 10 seconds) is regarded as the unoccupied condition.

In step S120 after an affirmative determination in step S110 (step S110:YES), the process collects condition parameters from various devices of the vehicle 100. In this case, the process requests for report of condition notices for respective devices, and the process collects condition parameters that are sent in response to the request. The collected condition parameters represent "detected conditions" of respective parts of the vehicle.

Then, in step S130, the process reads parameters representative of a normal condition of each of the respective parts from the memory 14. The "normal conditions" of the respective parts are, for example, the condition of the respective parts when the driver gets off from the vehicle 100 in an usual manner for leaving the vehicle 100 unattended. Therefore, the parameters representative of the normal conditions (i.e., "normal condition parameters") numerically represent the "normal conditions" described above, and are stored in the memory 14. Each of the normal condition parameters are updated in subsequent steps of the condition notification process in an appropriate manner, and are stored in the memory 14 in association with "cumulative values" and "cumulative counts" of the updates that are described later.

Then, in step S140, the process sends parameters collected in step S120 (i.e., "detected parameters" hereinafter) and parameters retrieved in step S130 (i.e., "normal parameters" hereinafter) as relevant information to the driver unit 20. In this case, the parameters themselves are generated and sent as the relevant information. The driver unit 20 receives the relevant parameters and stored in an overwriting manner in the memory 24.

Then, in step S150, the process compares the detected parameters with the normal parameters. In this case, a certain detected parameter among the detected parameters is compared with a corresponding normal parameter among the normal parameters, and the detected parameter having a difference that is greater than a predetermined threshold is picked up as a no-match parameter. More practically, the certain detected parameter and the corresponding normal parameter are parameters that represents a current condition and a normal condition of an identical certain part of the vehicle 100.

Then, in step S160, the process determines whether there is a no-match parameter among the detected parameters based on a comparison result in step S150. That is, the difference of the detected parameter having a difference value greater than the predetermined threshold from the corresponding normal parameter is examined for each of the detected parameters. The process returns to step S110 when there is no no-match parameter is detected (step S160:NO). The process proceeds to step S170 when the no-match parameter is detected (step S160:YES).

Then, in step S170, the process calculates an update parameter for updating the normal condition parameters. In this case, for each of the normal condition parameters, the cumulative value of the normal condition parameter is added to the detected parameter for generating the update parameter. In addition, the cumulative count of the normal condition parameter is incremented by 1. The detected parameter of a specific part is, as described above, also in association with the normal condition parameter of the same specific part of the vehicle 100 for representing an operation condition. The normal condition parameter of the specific part of the vehicle 100 is updated by calculating a division of the cumulative value by the cumulative count.

Then, in step S180, the process updates the normal condition parameter by replacing an old value in the memory 14 with a newly calculated value that is calculated in step S170. The process returns to step S110 after an update of the normal condition parameters.

Figure 3:
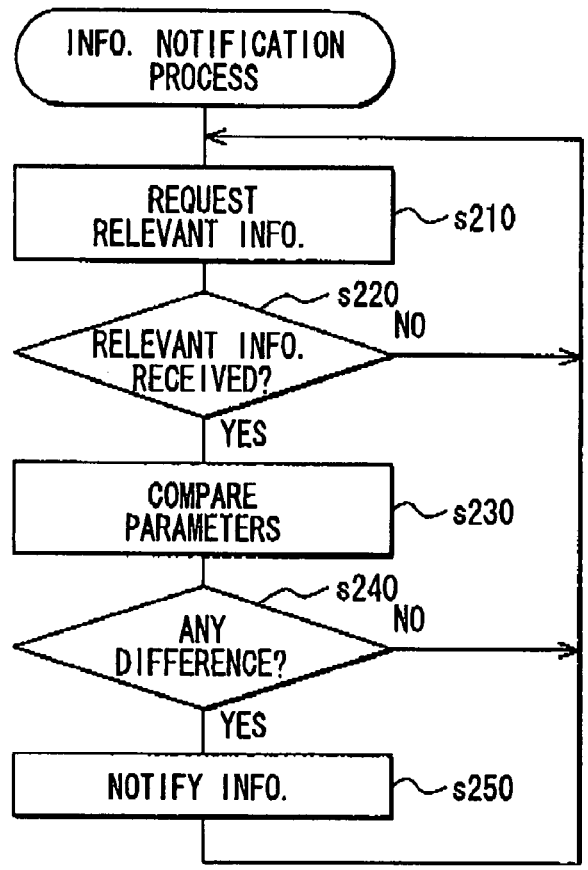
FIG. 3 shows a flowchart of an information notification process in a facility unit in the embodiment.

FIG. 3 shows a flowchart for an information notification process executed in the control unit 32 of the facility unit 30. The information notification process is repeatedly executed after the facility unit 30 is started.

The information notification process request the relevant information for the driver unit 20 after a predetermined amount of wait time (e.g., one second or the like) in step S210. The request is received by the driver unit 20 that exists within a reception area of the facility unit 30. The driver unit 20 that has received the request sends back the relevant information in the memory 24 to the facility unit 30 with a driver (i.e., a holder) identification information of the driver unit 20 associated therewith.

Then, in step S220, the process determines whether the relevant information is received within a predetermined time (e.g., within 500 ms) after the transmission of the request. The process returns to step S210 when the relevant information has not been received (step S220:NO). The process proceeds to step S230 when the relevant information has been received (step S220:YES).

Then, in step S230, the process compares each of the detected parameters with the normal condition parameters. The process determines whether any of the detected parameters is different from the corresponding normal condition parameters by more than a threshold value. In this case, the threshold of the difference is set to 30% of the normal condition parameter. The process returns to step S210 when there is no no-match parameters found in the comparison. The process proceeds to step S250 when there is no-match parameters among the detected parameters.

Then, in step S250, the process provides the notice of the no-match parameters. That is, the in this case, the process controls the display unit 36 to display the notice, and the display unit 36 displays the notice in response. The notice is displayed for drawing attention that the vehicle 100 that is associated with a driver, i.e., a user of the driver unit 20 that has sent the relevant information to the facility unit 30 in step S220, is left unattended in an unusual manner.

In this manner, the information provision system 1 stores the detected conditions of respective parts of the vehicle 100 in the driver unit 20 at a time when driver's action of getting out of the vehicle 100 is detected (step S110:YES). The detected conditions are stored as the relevant information that is in association with the normal conditions of the respective parts of the vehicle 100 in an usual unattended condition.

After the storage of the relevant information in the driver unit 20, the relevant information is sent to the facility unit 30 from the driver unit 20 when the driver visits the facility that has the facility unit 30. More practically, when the driver enters into a reception area of the radio communication of the facility unit 30, the relevant information is transmitted from the driver unit 20 held by the driver of the vehicle 100 to the facility unit 30 (as described as step S220). Then, the facility unit 30 executes a comparison process that determines to what degrees the detected condition is different from the normal condition in the relevant information. The result of the comparison process is notified after the comparison (as described as steps S230 to S250).

Therefore, the detected condition of any of the respective parts of the vehicle 100 not in an appropriate state that is different from the usual unattended condition of the vehicle 100 is reported to the driver of the vehicle 100, or to an operator in the facility who can contact the driver. As a result, the driver of the vehicle 100 can promptly recognize the inappropriate condition of the vehicle 100.

The inappropriate condition of the vehicle 100 left unattended may be, for example, a turn-on condition of the lamp when a turn-off condition of the lamp is set as the normal condition as the parameter of a lamp part. The inappropriate condition may also be an unlock condition of the door of the vehicle 100, when a locked condition of the door is set as the normal condition. Thus, the inappropriate condition of the vehicle 100 is notified to the driver for preventing the draining of the battery, or for preventing a theft of personal belongings left in the vehicle 100.

Further, the process load in the driver unit 20 is decreased by sending parameters of the detected conditions to the facility unit 30 and by calculating the difference of the detected condition from the normal condition in the facility unit 30.

Furthermore, the process in the facility unit 30 provides the notice of the inappropriate condition only when the detected parameter is different from the normal condition by a value that is greater than a predetermined threshold. That is, when the detected condition is close to the normal condition, a false notice of the inappropriate condition is prevented from being delivered to the driver of the vehicle 100.

Furthermore, the process in the vehicle unit 10 collects and updates the normal condition parameters when the collected parameters of the detected conditions are different from the normal conditions more than the predetermined threshold. That is, a preference, a habit, or a modification may be reflected to the normal condition of the respective parts.

Although the present invention has been fully described in connection with the preferred embodiment thereof with reference to the accompanying drawings, it is to be noted that various changes and modifications will become apparent to those skilled in the art.

For example, the driver unit 20 may be integrally formed with a different device that is held by the driver of the vehicle 100. That is, for example, the driver unit 20 may be formed as a part of a cellular phone, or may be formed as an IC card.

Further, the driver unit 20 may communicate with the vehicle unit 10 by a different type communication. That is, data may be sent from the vehicle unit 10 to the driver unit 20 through a wired communication.

Furthermore, the relevant information may be associated with different information when transmitted to the facility unit 30. That is, the relevant information may be associated with vehicle identification information such as a vehicle model, a license plate number, or a color of the vehicle 100. The vehicle identification information associated with the relevant information may facilitate an identification of the vehicle 100 by the driver when the notice of the inappropriate vehicle condition is provided.

Furthermore, the periodical reporting of the condition parameters from respective device to the vehicle unit 10 may have different configuration. That is, the periodical reporting of the condition to the vehicle unit 10 may be assisted by an on-demand reporting, such as a reporting to the vehicle unit 10 at a time of any condition change.

Furthermore, the unoccupied condition of the vehicle 100 may be detected in a different manner. That is, for example, the vehicle unit 10 may detect, as a sign of the unoccupied condition, an open and a close of the door of the vehicle 100 with a sensor after a report of stopping the engine of the vehicle 100.

Furthermore, the conditions of the lamps, the conditions of the door locks, the conditions of the windows, the internal image of the vehicle 100 may be replaced with other conditions for calculating parameters. That is, for example, the door open condition may be represented as numerical parameters such as "1" (opening), "0" (closing) or the like. The parameters are then transmitted to the vehicle unit 10.

Furthermore, the update of the normal condition parameters may be executed even when the collected data of the detected parameters are not different from the normal condition parameters by the value that is greater than the predetermined threshold. More practically, the process in FIG. 2 may proceed to step S170 directly from step S160 without performing step S150.

Figure 5:
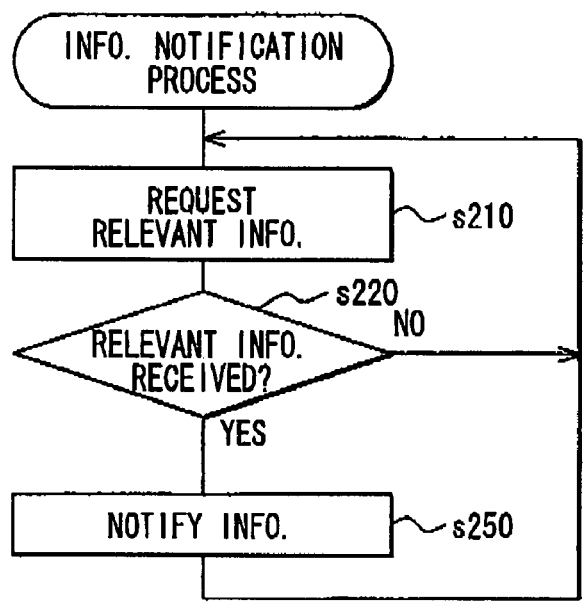
FIG. 5 shows a flowchart of an information notification process in the facility unit in another embodiment.
Figure 4:
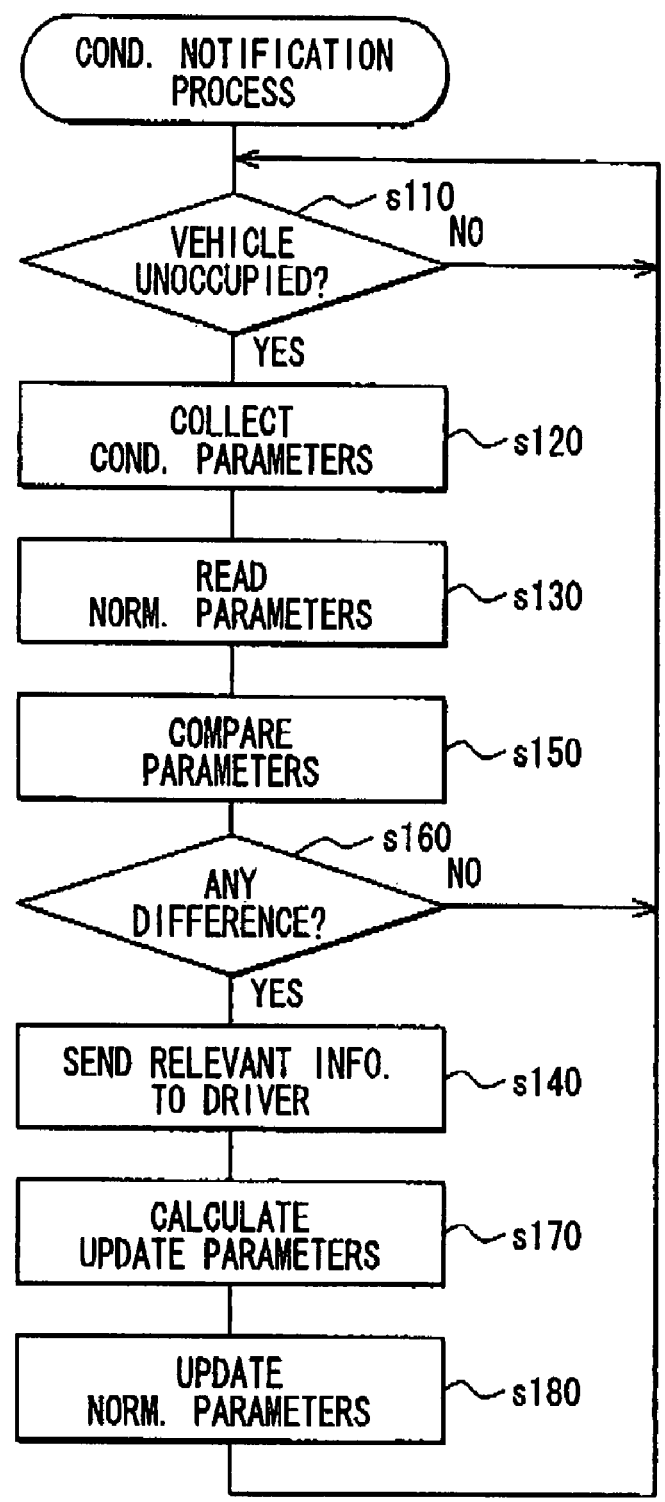
FIG. 4 shows a flowchart of a condition notification process in the vehicle unit in another embodiment.

Furthermore, the comparison of the detected parameters and the normal condition parameters may be performed in the vehicle unit 10 for transmitting only the comparison result. That is, the condition notification process in FIG. 2 may be changed to the similar process as shown in FIG. 4. In the condition notification process in FIG. 4, step S130 is succeeded by step S150, and the comparison result in the affirmative in step S160 (YES in S160) is exclusively succeeded by the transmission of the relevant information to the driver unit 20 in step S140. In this case, the information notification process in FIG. 3 may be changed to a similar process as shown in FIG. 5. That is, in the information notification process in FIG. 5, the information is received in step S220, step S220 is succeeded by the notification of the information in step S250 without performing steps S230 and S240. The relevant information to be transmitted may include information that only indicates the existence of the no-match parameter, or information indicative of what parameter having difference to what degree or the like. In this manner, the facility unit 30 can immediately determine the degree of the difference between the detected condition and the normal condition. Therefore, the process load of the facility unit 30 can be decreased. The decrease of the process load may be especially advantageous when the number of the driver units 20 increases. Furthermore, an useless traffic of parameter information transmission because the communication between the vehicle unit 10 and the driver unit 20, and between the driver unit 20 and the facility unit 30 is established only when there exists a parameter that is difference of equal to or greater than the predetermined threshold.

Figure 6:
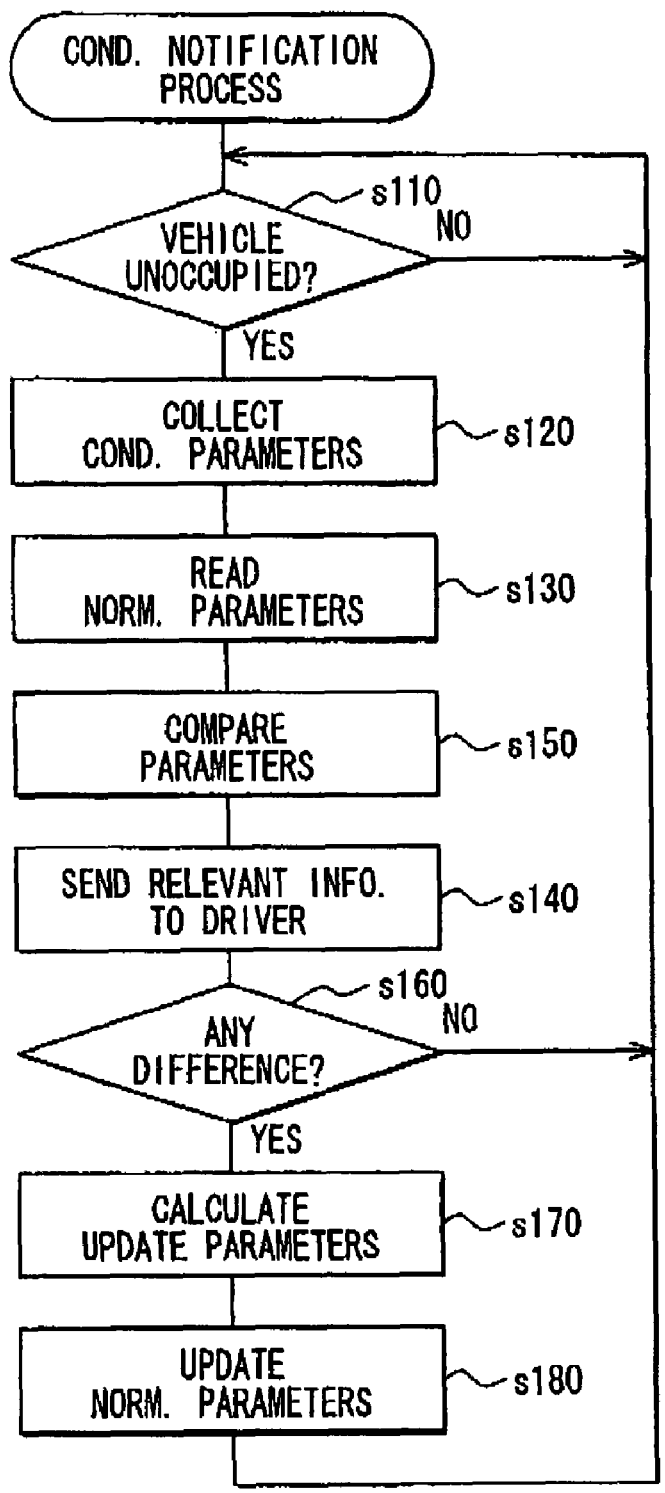
FIG. 6 shows a flowchart of a condition notification process in the vehicle unit in yet another embodiment.

Furthermore, the relevant information may be exchanged between those units regardless of the existence of the no-match parameters. More practically, the condition notification process may be changed to a similar process as shown in FIG. 6 that step S140 for sending the relevant information comes after step S150.

Furthermore, the information provision system 1 may provide a single set of the normal condition parameters in the memory 14 of the vehicle unit 10, or may provide plural sets of the normal condition parameters for alternative uses depending on conditions. The conditions for alternative uses may be, for example, associated with a current position of the vehicle 100. The current position of the vehicle may be incorporated into the detected condition by having the current vehicle position as a parameter from the navigation system 123 as shown in FIG. 1, and one of the plural sets of the normal condition parameters may be retrieved according to the current vehicle position specified by the parameter. In this manner, the information provision system 1 may appropriately determine the difference of the detected condition from the normal condition according to various current position of the vehicle 100.

Such changes and modifications are to be understood as being within the scope of the present invention as defined by the appended claims.

What is claimed is:

1. An information provision system having a vehicle unit disposed on a vehicle, a driver unit held by a driver of the vehicle, and a facility unit provided in a facility that can be visited by the driver comprising:
    a condition detector in the vehicle unit for detecting a current vehicle condition regarding various parts in the vehicle;
    an absence detector in the vehicle unit for detecting driver's absence from the vehicle based on the current vehicle condition detected by the condition detector;
    a vehicle side transmitter in the vehicle unit for transmitting the current vehicle condition detected by the condition detector in association with a normal unattended condition that is defined as a normal condition of an unattended vehicle as relevant information when the driver's absence is detected by the absence detector;
    an information storage in the driver unit for storing the relevant information transmitted from the vehicle unit;
    a driver side transmitter in the driver unit for transmitting the relevant information stored in the information storage to the facility unit;
    a difference detector in the facility unit for detecting a degree of difference between the current vehicle condition and the normal unattended condition in the relevant information; and
    a notification device in the facility unit for providing a notice according to a detection result derived from the difference detector.

2. The information provision system of claim 1,
    wherein, when the absence detector has detected the driver's absence, the vehicle side transmitter in the vehicle unit transmits current condition parameters numerically representative of the current vehicle condition regarding the various parts in the vehicle and reference parameters numerically representative of the normal unattended condition regarding the various parts in the vehicle as the relevant information to the driver unit, and
    the difference detector in the facility unit determines, based on the relevant information transmitted from the driver unit, whether there is any greater-than-threshold difference when the current condition parameters of various parts in the vehicle are compared with the reference parameters of corresponding various parts in the vehicle.

3. The information provision system of claim 1 further comprising:
    a condition comparator in the vehicle unit,
    wherein the parameter comparator compares current condition parameters numerically representative of the current vehicle condition regarding the various parts in the vehicle and reference parameters numerically representative of the normal unattended condition regarding the various parts in the vehicle,
    the vehicle side transmitter in the vehicle unit transmits a comparison result of current condition parameters with the reference parameters as the relevant information to the driver unit, and
    the difference detector in the facility unit determines, based on a comparison result in the relevant information transmitted from the driver unit, whether there is any current condition parameter of a certain part having a greater-than-threshold difference from the reference parameter of the same part in the vehicle.

4. The information provision system of claim 3,
    wherein, when the comparison result indicates that there is at least one current condition parameter of the certain part having the greater-than-threshold difference from the reference parameter of the same part, the vehicle side transmitter in the vehicle unit transmits an existence of the greater-than-threshold difference of the at least one current condition parameter as the relevant information to the driver unit, and
    the difference detector in the facility unit determines that there is at least one current condition parameter of the certain part having the greater-than-threshold difference from the reference parameter of the same part when the relevant information is transmitted from the driver unit.

5. The information provision system of claim 2,
    wherein the notification device in the facility unit provides, to various parts in the vehicle, a notice that at least one part of the vehicle is in a condition different from the normal unattended condition only when the difference detector has determined that there is at least one current condition parameter of the certain part having the greater-than-threshold difference from the reference parameter of the same part.

6. The information provision system of claim 1 further comprising:
   a condition changer in the vehicle unit for changing the normal unattended condition to an up-to-date condition that reflects an updated current vehicle condition when the current vehicle condition is detected by the condition detector.

7. The information provision system of claim 1 further comprising:
   a position detector in the vehicle unit for detecting a current position of the vehicle; and
   a condition selector in the vehicle unit for selecting one of plural normal unattended conditions respectively associated with plural instances of the current position,
   wherein the vehicle side transmitter transmits the current vehicle condition in association with the one of the plural normal unattended conditions based on the current position detected by the position detector as the relevant information to the driver unit.

8. A terminal of the information provision system of claim 1,
   wherein all components in the vehicle unit are provided in the terminal.

9. A terminal of the information provision system of claim 1,
   wherein all components in the facility unit are provided in the terminal.

10. A program for use in the information provision system of claim 1,
    wherein the program stored in a storage medium for operating a computer as the information provision system, and
    all components in the vehicle unit are provided as a procedure of steps in the program.

11. A program for use in the information provision system of claim 1,
    wherein the program stored in a storage medium for operating a computer as the information provision system, and
    all components in the facility unit are provided as a procedure of steps in the program.

* * * * *